L. B. LYONS.
CAR-TRUCK.
No. 182,455. Patented Sept. 19, 1876.
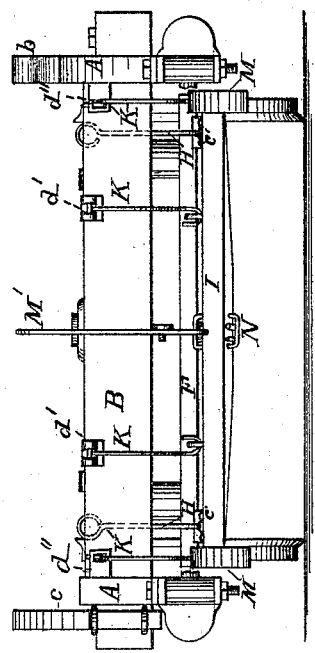
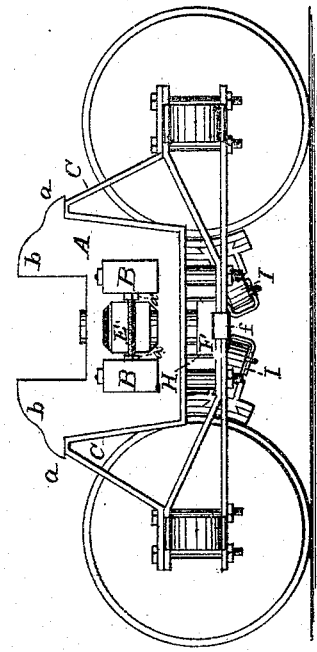
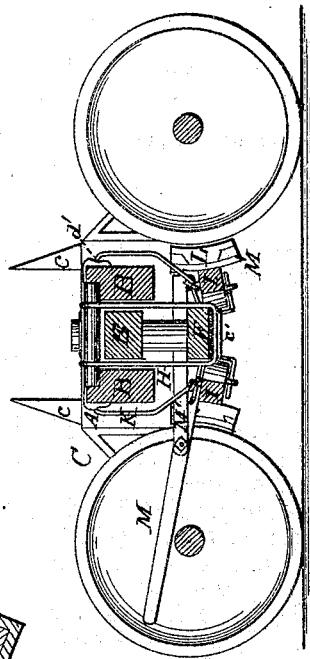
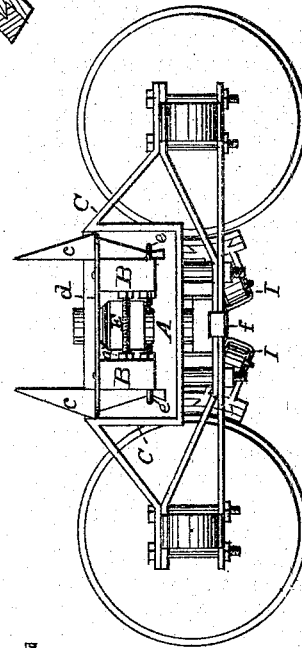
WITNESSES:
INVENTOR:
L. B. Lyons
BY
ATTORNEYS.

UNITED STATES PATENT OFFICE.

LABAN B. LYONS, OF CHILLICOTHE, OHIO.

IMPROVEMENT IN CAR-TRUCKS.

Specification forming part of Letters Patent No. 182,455, dated September 19, 1876; application filed July 20, 1876.

*To all whom it may concern:*

Be it known that I, LABAN B. LYONS, of Chillicothe, in the county of Ross and State of Ohio, have invented a new and Improved Railroad-Car Truck; and I do hereby declare that the following is a full, clear, and exact description of the same.

The invention relates to the construction and arrangement of parts, as hereinafter described and claimed.

In the accompanying drawing, forming part of this specification, Figures 1 and 3 are, respectively, a side and end elevation of the truck. Fig. 2 is a side elevation, showing a modification; and Fig. 4, a cross-section of the same. Figs. 5 and 6 are detail views.

The cast-iron frames or pieces A are mortised to receive the ends of the parallel truck-timbers B, and provided with lugs or projections $a$ to bear upon the angular truck-iron C. The latter may have either a gentle curve or acute angle at those points, passing thence around and beneath the casting or frame A, by which the weight from the car and part of the truck is thrown above and onto the truck-iron, as shown. The frames A may be provided with vertical arms $b$, as in Fig. 1; but when unprovided with such arms, as shown in Figs. 2 and 4, I employ the detachable guards $c\ c$. These are attached to the ends of the truck-timbers B by means of a closed link, $d$, which rests on the upper side of the truck-timbers, and screw-clamps or hooks $e$, which pass through the same.

If the truck should get off the track and one of the wheels on either side strike some object, the truck is liable to slue until its line of direction, as indicated by the wheels, may be a departure from the line of track of from one to ninety degrees. The function of the guards is to prevent this sluing, and thus avoid the danger of the train being completely wrecked from the truck turning crosswise of the car, and turning over, &c. It is of course necessary to allow the truck to slue somewhat in passing around curves; but more than this is dangerous, and must be provided against.

Another advantage derived from the use of the guards is that if the king or pivot bolt of the truck breaks or becomes loose or detached the truck cannot get much out of place.

The timbers B will usually shrink somewhat after having been in use for a considerable period, and to compensate for the shrinkage, and still secure them firmly in the frames A A, I employ the double-threaded screw-rod E, arranged horizontally between the ends of the timbers and set-nuts $a'$, which are screwed up against the inner sides of the timbers. A band, $f$, is shown applied to the lower truck-iron C' and strap D. If the nuts of the bolts which secure the truck-strap to the truck-iron and the pedestals E' become loose, the strap would still be held in place by means of the band $f$. The band is slipped over the truck-iron before the latter is put in its place, and the truck-strap then passed through it.

The body-bolster of the car is supported in the usual manner upon the compound vibrating beams F', which are placed between the timbers B B, and suspended from them by hangers or cranked pendulum-rods H. Grooved plates $c'$ are attached to the under side of beam G to act as friction-bearings for hangers H. These hangers are made in one piece, and hence occupy less space in the truck, are less liable to break under severe strain, or become loose, detached, or misplaced than those ordinarily employed, which are composed of three parts. The brake-beams I are suspended from the timbers B by means of hangers K K', which are in the form of a double hook. The hangers K connect with the body of the brake-beams by means of staples, and are suspended from brackets $d'$ secured to the timbers. The outer hangers K' are suspended from the inwardly-projecting arms $d''$ of the frames A A, being made detachable therefrom by means of the removable pins, and their lower ends pass through a notch or open slot in the brake-shoe L and a hole in the brake-head M, thus securing them together, Fig. 6. The brake-head has a segmental dovetailed projection, and the shoe a corresponding cavity to receive the same. The shoe has also a central lug or pin, $i$, which enters a recess in the middle of the head, thus making it impossible for the shoe to get out of place so long as the hanger K' is attached. When the hanger K' is detached the shoe may be turned on this pin $i$ as a pivot until it disengages from the dovetail projection.

The brake-heads M are constructed with an extension forming a socket or keeper, $l$, to receive the ends of the brake-beams I. This obviates, in part, the use of screw-bolts, and forms a strong and secure connection between the head and beams. The compound brake-lever M' is connected to the brake-beams by means of hooks N. The same pass around the beams, and are secured by a link, which passes through the beams.

By this means of attachment I dispense with several bolts and nuts that are generally used in making the connections, and which are liable to become loose or lost, thus rendering the brake mechanism useless, or allowing the brake-beams to drop upon the track, and thus endanger the safety of the train.

By the above-described mode of constructing the several parts of the truck the use of bolts and nuts is largely obviated without increasing the cost or lessening the strength of the truck.

What I claim is—

1. The detachable guards and confining link and hooks, in combination with the truck-beams, as shown and described.

2. The angular truck-irons, in combination with the metal frame, provided with lateral and vertical projections, substantially as shown and described.

3. The U-shaped hangers, made in one piece, in combination with the vibrating bearing or beam, as shown and described.

4. The detachable hook-hangers, for suspending the brake-beam, in combination with the brackets $d''$, having removable pins, as shown and described.

5. The combination of the hangers with the pivoted brake-shoes and the brake-head, the latter having a notch or open slot to receive the rod, whereby the shoe is held in proper position on the head, as shown and described.

6. The combination, with the brake-beams, of the sliding hooks N, the link or staple O for securing the latter, and the operating-lever, as shown and described, for the purpose specified.

7. The brake-beams, double hook-hangers, and recessed blocks attached to the beam to support the beams, and adapt them for convenient detachment, as set forth.

8. The cast frames A A, having mortises for reception of the ends of the truck-timbers, as shown and described.

LABAN B. LYONS.

Witnesses:
J. L. THROCKMORTON,
H. M. WARE.